US009013169B2

(12) United States Patent
Fu et al.

(10) Patent No.: US 9,013,169 B2
(45) Date of Patent: Apr. 21, 2015

(54) SOFT-START TIME CONTROL CIRCUIT

(71) Applicants: Hong Fu Jin Precision Industry (ShenZhen) Co., Ltd., Shenzhen (CN); Hon Hai Precision Industry Co., Ltd., New Taipei (TW)

(72) Inventors: Ying-Bin Fu, Shenzhen (CN); Yuan-Xi Chen, Shenzhen (CN); Ya-Jun Pan, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 118 days.

(21) Appl. No.: 13/853,203

(22) Filed: Mar. 29, 2013

(65) Prior Publication Data

US 2013/0271104 A1 Oct. 17, 2013

(30) Foreign Application Priority Data

Apr. 16, 2012 (CN) ............................ 201210109805

(51) Int. Cl.
*G05F 5/00* (2006.01)
*H02M 1/36* (2007.01)
*G05F 3/08* (2006.01)

(52) U.S. Cl.
CPC ............... *G05F 3/08* (2013.01); *Y10S 323/901* (2013.01)

(58) Field of Classification Search
USPC ......... 323/268, 283, 284, 288, 299, 350, 901; 327/394, 396
See application file for complete search history.

(56) References Cited

U.S. PATENT DOCUMENTS

| | | | | |
|---|---|---|---|---|
| 7,719,863 | B2 * | 5/2010 | Yeh et al. | 363/49 |
| 8,570,018 | B2 * | 10/2013 | Lai | 323/284 |
| 2005/0285576 | A1 * | 12/2005 | Achart et al. | 323/235 |
| 2009/0116153 | A1 * | 5/2009 | Lin et al. | 361/18 |
| 2009/0295340 | A1 * | 12/2009 | Kwon et al. | 323/220 |
| 2010/0164579 | A1 * | 7/2010 | Acatrinei | 327/172 |

* cited by examiner

*Primary Examiner* — Fred E Finch, III
(74) *Attorney, Agent, or Firm* — Novak Druce Connolly Bove + Quigg LLP

(57) ABSTRACT

A control circuit for controlling a soft-start time of a DC power supply includes a digital potentiometer, a first drive circuit, and a controller. The digital potentiometer includes a first potentiometer. The first drive circuit includes a first driver, a first MOSFET, and a first charge capacitor. The first driver charges the first charge capacitor via the first potentiometer when the DC power supply is first switched on, and the first MOSFET is switched on to connect the DC power supply to the load when the first charge capacitor is fully charged. The controller regulates resistance of the first potentiometer to regulate a charge time constant of the first charge capacitor, enabling a gradual rise in voltage supplied, from approximately zero to full power, within a desired period of time.

20 Claims, 5 Drawing Sheets

SOFT-START TIME CONTROL CIRCUIT

BACKGROUND

1. Technical Field

The exemplary disclosure generally relates to control circuits, and particularly to a time control circuit for direct current (DC) power supply which allows a gradual application of electrical power.

2. Description of Related Art

A DC power supply experiences an extremely large transient current at a time when the DC power supply turns on. A soft-start circuit is usually connected to an input terminal of the DC power supply to prevent the DC power supply from being damaged by the large transient current. When the DC power supply works as input power of a test circuit, the test circuit usually has a particular need for a soft-start of the DC power supply. If the soft-starting time of the DC power supply does not match the requirement of test circuit, performance of the test circuit will be affected.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the disclosure.

DETAILED DESCRIPTION

Figure 1:
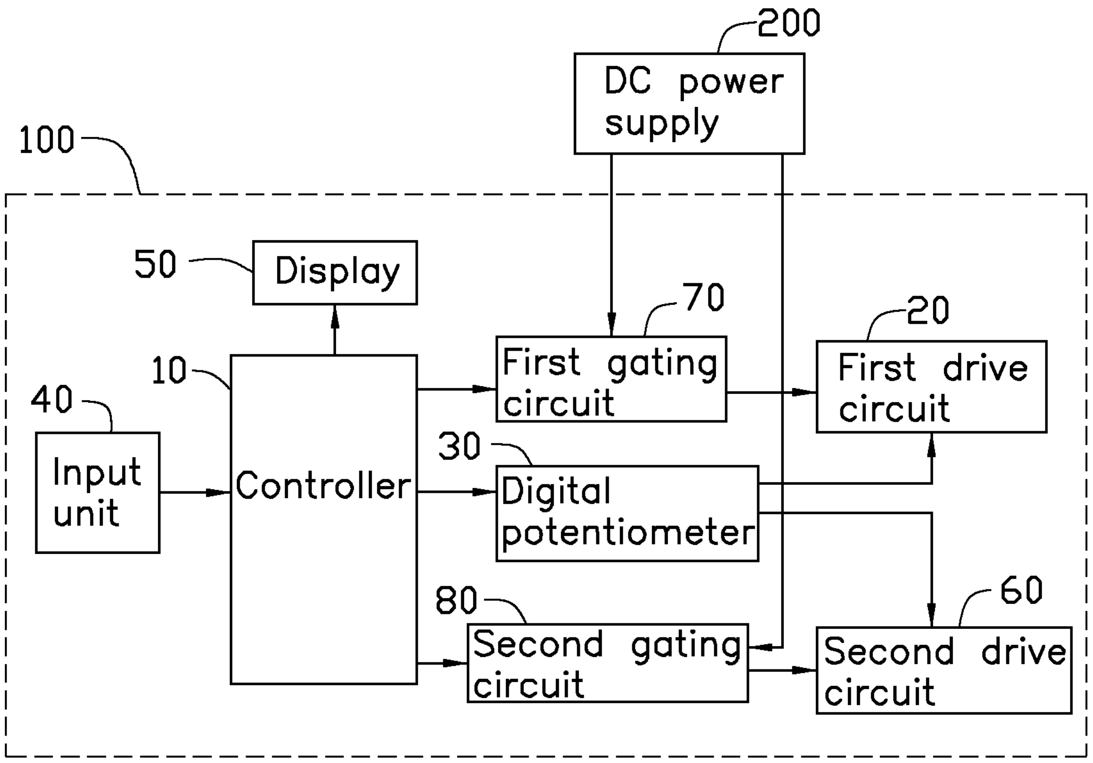
FIG. 1 shows a schematic functional block diagram of an exemplary embodiment of a soft-start time control circuit for controlling a soft-start time of a DC power supply.

FIG. 1 shows a schematic functional block diagram of an exemplary embodiment of a soft-start time control circuit 100 for controlling a period of time (soft-start time) within which a DC power supply 200 gradually outputs full power from a start level which is close to zero volts. The control circuit 100 includes a controller 10, a first drive circuit 20, a digital potentiometer 30, an input unit 40, and a display 50. The input unit 40 is capable of inputting a desired value of the soft-start time of the DC power supply 200.

The controller 10 is electronically connected to the digital potentiometer 30, the input unit 40, and the display 50. The controller 10 receives the desired value of the soft-start time of the DC power supply 200, displays the desired value on the display 50, and regulates resistance of the digital potentiometer 30 which is connected to the first drive circuit 20 according to a value of the desired soft-start time.

Figure 2:
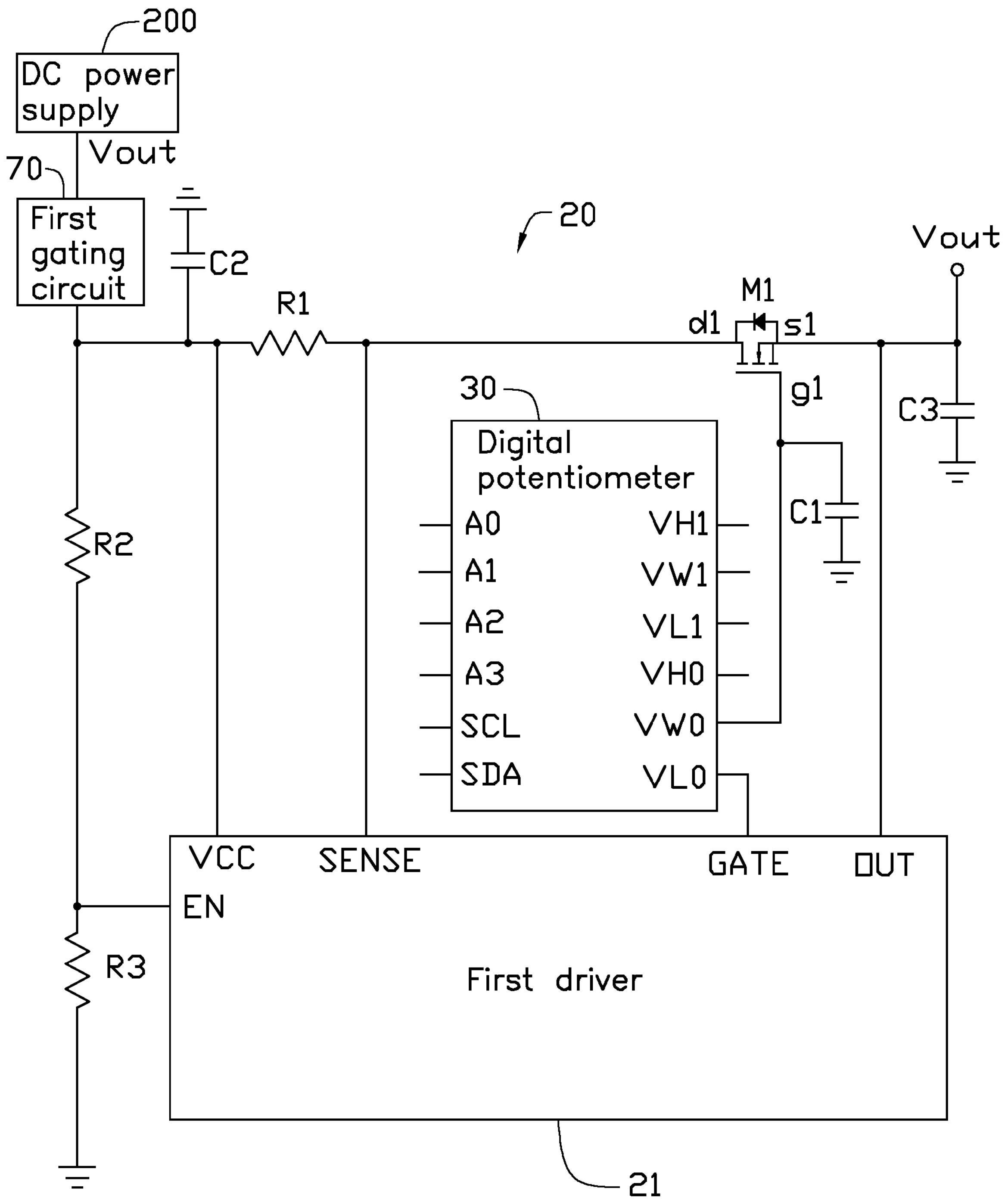
FIG. 2 shows a schematic circuit diagram of an exemplary embodiment of a first drive circuit of the soft-start time control circuit shown in FIG. 1.

FIG. 2 shows a circuit diagram of the first drive circuit 20 of the soft-start time control circuit 100 shown in FIG. 1. The first drive circuit 20 includes a first driver 21, a first metal-oxide-semiconductor field-effect transistor (MOSFET) M1, a first charge capacitor C1, two filtering capacitors C2-C3, a first current detection resistor R1, a first voltage dividing resistor R2, and a second voltage dividing resistor R3. The first current detection resistor R1 is electronically connected between an output of the DC power supply 200 and a drain d1 of the first MOSFET M1. In the exemplary embodiment, the first current detection resistor R1 is electronically connected to the DC power supply 200 via a first gating circuit 70 (described below). A source s1 of the first MOSFET M1 is grounded via the filtering capacitor C3, and a node between the source s1 and the filtering capacitor C3 is electronically connected to a load (not shown), to output an output voltage Vout from the DC power supply 200. A node between the first current detection resistor R1 and the output of the DC power supply is grounded via the filtering capacitor C2. The first and second voltage dividing resistors R2 and R3 are connected in series between the output of the DC power supply 200 and ground.

The first driver 21 outputs a drive current to switch on the first MOSFET M1. The first driver 21 includes an enable pin EN, a power pin VCC, a current detection pin SENSE, a drive pin GATE, and an output pin OUT. The enable pin EN is electronically connected between the first and second voltage dividing resistors R2 and R3; the power pin VCC and the current detection pin SENSE are electronically connected to the two terminals of the first current detection resistor R1; the drive pin GATE is electronically connected to the gate g1 of the first MOSFET M1 via the digital potentiometer 30; and the output pin OUT is electronically connected to a node between the source s1 of the first MOSFET M1 and the filtering capacitor C3. The current detection pin SENSE of the first driver 21 cooperates with the first current detection resistor R1 to detecting an output current of the DC power supply 200. A node between the digital potentiometer 30 and the gate g1 of the first MOSFET M1 is grounded via the first charge capacitor C1.

The digital potentiometer 30 includes a clock pin SCL, a date pin SDA, two wiper pins VW0 and VW1, two first connection pins VH0 and VH1, two second connection pins VL0 and VL1, and four address pins A0-A3. The mode of connecting the clock pin SCL, the data pin SDA, and the address pins A0-A3 to the controller 10 is well-known, thus the connection circuits between the clock pin SCL, the data pin SDA, the address pins A0-A3 and the controller 10 are not shown in FIGS. 1-5. The controller 10 transmits control signals to the digital potentiometer 30 via the clock pin SCL and the data pin SDA, and controls the address pins A0-A3 to choose different potentiometers to be controlled. For example, when the programming of the address pins A0-A3 is "0000", a first potentiometer of the digital potentiometer 30 is chosen; when the programming of the address pins A0-A3 is "0001", a second potentiometer of the digital potentiometer 30 is chosen. The first potentiometer is electronically connected to the wiper pin VW0, the first connection pin VH0, and the second connection pin VL0; and the second potentiometer is electronically connected to the wiper pin VW1, the first connection pin VH1, and the second connection pin VL1. The wiper pin VW0 and the second connection pin VL0 are electronically connected to the gate g1 of the first MOSFET M1 and the drive pin GATE of the first driver 21 respectively; and the first connection pin VH0 is not connected.

When the DC power supply 200 is switched on, the enable pin EN of the first driver 21 switches to high to enable the first driver 21. The first driver 21 outputs current from the drive pin GATE to charge the first charge capacitor C1 via the first potentiometer of the digital potentiometer 30. The voltage of the first charge capacitor C1 is increased as the first drive 21 charges the first charge capacitor C1, until the first MOSFET M1 is switched on. In the exemplary embodiment, when the first charge capacitor C1 is fully charged, a voltage on the first charge capacitor C1 drives the first MOSFET M1 to switch on, and the output voltage Vout of the DC power supply 200 is output through the first MOSFET M1. A charge time constant T1 of the first charge capacitor C1 can be calculated by a formula: T1=R*C, where R is a resistance of the digital potentiometer 30, and C is a capacitance of the first charge capacitor C1. The first charge capacitor C1 is fully charged when a charge time of the first capacitor C1 reaches to the charge time constant T1. That is, the charge time constant T1 is the soft-start time of the DC power supply 200. When the charge time constant T1 of the first charge capacitor C1 is changed, that is, when a charge speed of the first charge capacitor C1 is changed, a switch-off duration of the first MOSFET M1 will be changed accordingly. Thus, in use, the controller 10 calculates a resistance R according to different soft-start times input by the input unit 40 and the formula T1=R*C, and regulates the resistance of the first potentiometer of the digital potentiometer 30, thereby controlling the soft-start time of the DC power supply 200.

In the exemplary embodiment, the output voltage Vout range of the DC power supply 200 is 2.5V-80V. Since an input voltage of the first driver 21 in the exemplary embodiment is in a range of 2.5V-18V, thus when an input voltage of the first driver 21 is higher than 18V, the first driver 21 is unable to work. Thus, in one embodiment, the soft-time control circuit 100 further includes a second drive circuit 60, a first gating circuit 70, and a second gating circuit 80.

Figure 3:
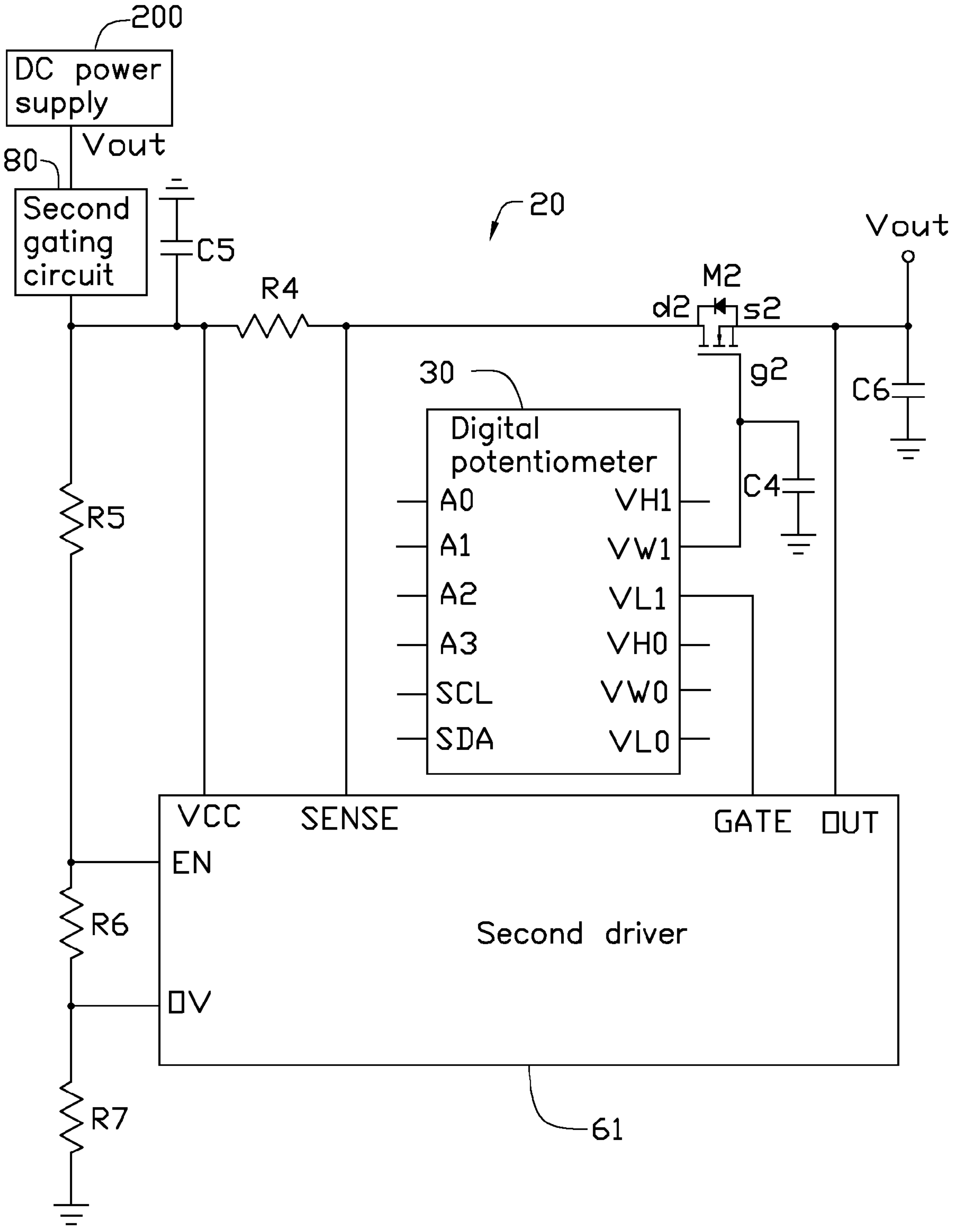
FIG. 3 shows a schematic circuit diagram of an exemplary embodiment of a second drive circuit of the soft-start time control circuit shown in FIG. 1.

FIG. 3 shows a circuit diagram of the second drive circuit 60 of the soft-start time control circuit 100 shown in FIG. 1. The second drive circuit 60 includes a second driver 61, a second MOSFET M2, a second charge capacitor C4, two filtering capacitor C5-C6, a second current detection resistor R4, a third voltage dividing resistor R5, a fourth voltage dividing resistor R6, and a fifth voltage dividing resistor R7. The second current detection resistor R4 is electronically connected between the output of the DC power supply 200 and a drain d2 of the second MOSFET M2. In the exemplary embodiment, the second current detection resistor R4 is electronically connected to the DC power supply 200 via the second gating circuit 80. A source s2 of the second MOSFET M2 is grounded via the filtering capacitor C6, and a node between the source s2 and the filtering capacitor C6 outputs the output voltage Vout of the DC power supply to the load. A node between the second current detection resistor R4 and the output of the DC power supply 200 is grounded via the filtering capacitor C5. The third to fifth voltage dividing resistors R5-R7 are connected in series between the output of the DC power supply and ground. The second driver 61 outputs drive current to the gate g2 of the second MOSFET M2 to switch on the second MOSFET M2. In one embodiment, an input voltage of the second driver 61 is in a range of 9V-80V. The second driver 61 includes an enable pin EN, a power pin VCC, a current detection pin SENSE, a drive pin GATE, an output pin OUT, and an over-voltage detection pin OV. The enable pin EN is electronically connected to a node between the third and fourth voltage dividing resistors R5 and R6; the over-voltage detection pin OV is electronically connected to a node between the fourth and fifth voltage dividing resistors R6 and R7; the power pin VCC and the current detection pin SENSE are electronically connected to two terminals of the second current detection resistor R4; the drive pin GATE is electronically connected to the second connect connection PIN VL1; and the output pin OUT is electronically connected to a node between the source s2 of the second MOSFET M2 and the filtering capacitor C6. A gate g2 of the second MOSFET M2 is electronically connected to the wiper pin VW1 of the digital potentiometer 30, and a node between the gate g2 and the wiper pin VW1 of the digital potentiometer 30 is grounded via the second charge capacitor C4.

The second driver 61 outputs current to charge the second charge capacitor C4 via the digital potentiometer 30, and when the second charge capacitor C4 is fully charged, the second MOSFET M2 is switched on, and the output voltage Vout of the DC power supply 200 is output via the second MOSFET M2. A charge time constant T2 of the second charge capacitor C4 is calculated by a formula: T2=R*C, where R is a resistance of the digital potentiometer 30, and C is a capacitance of the second charge capacitor C4. The second charge capacitor C4 is fully charged when a charge time of the second capacitor C4 reaches the charge time constant T2.

Figure 4:
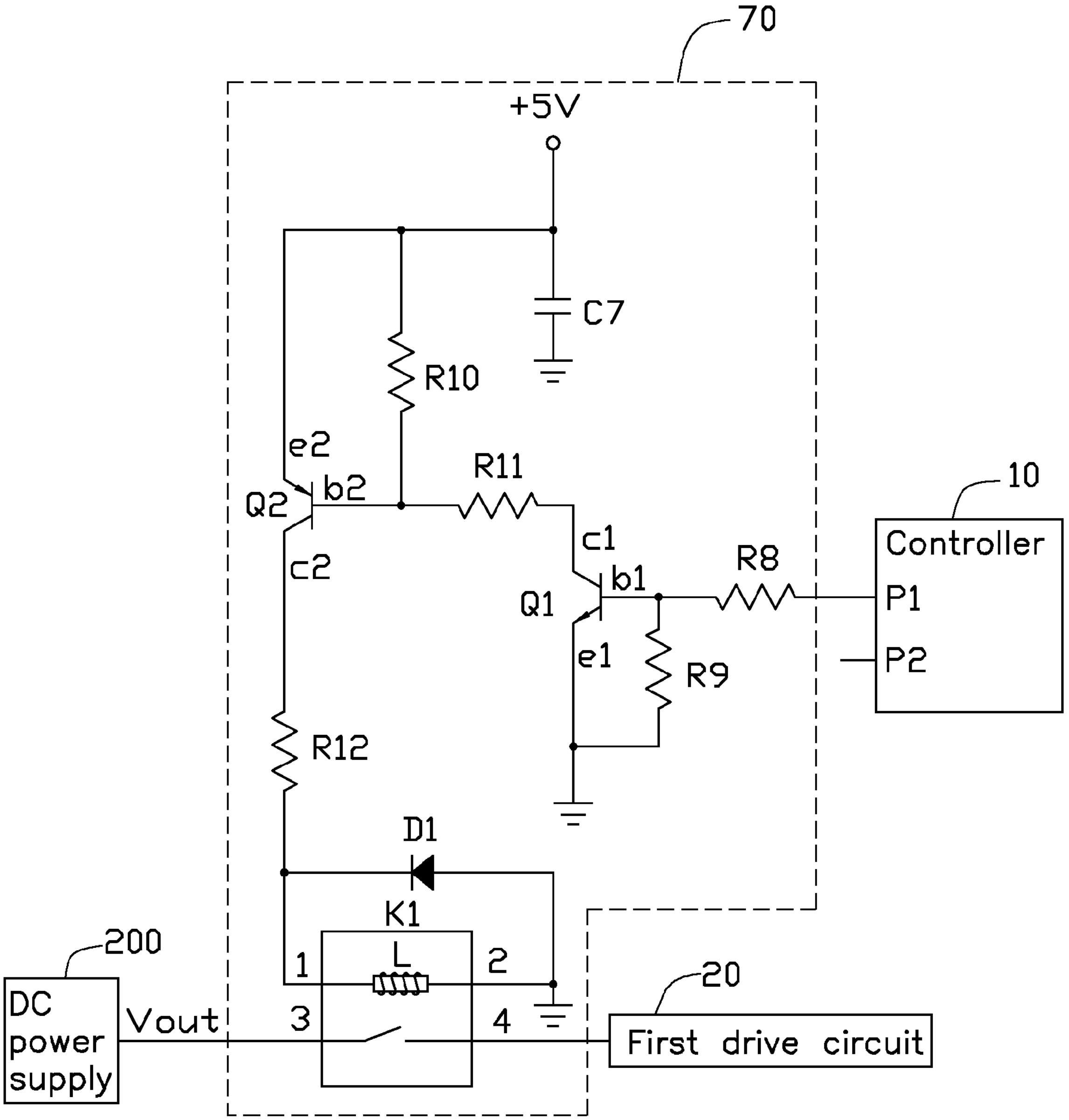
FIG. 4 shows a schematic circuit diagram of an exemplary embodiment of a first gating circuit of the soft-start time control circuit shown in FIG. 1.
Figure 5:
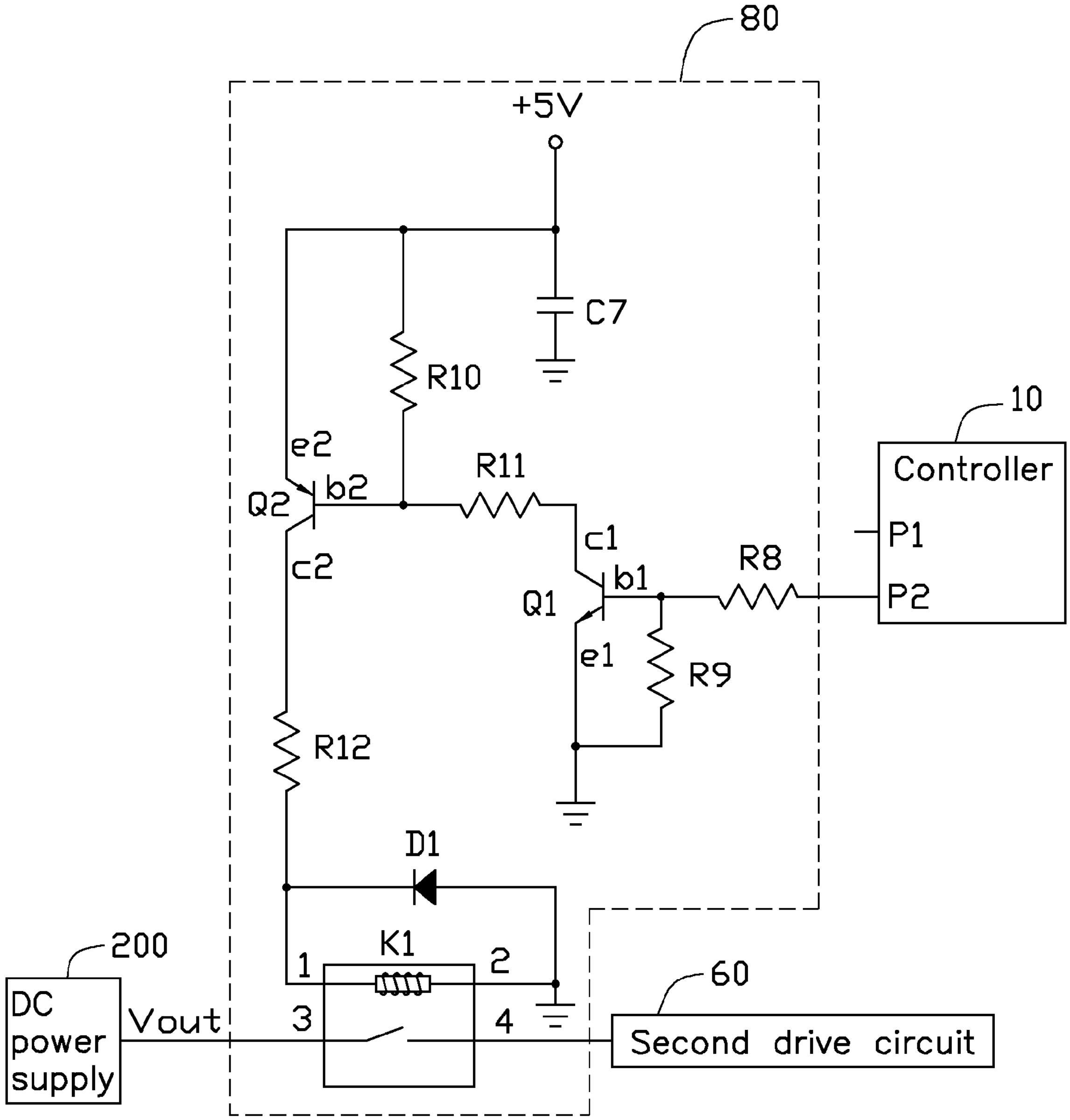
FIG. 5 shows a schematic circuit diagram of an exemplary embodiment of a second gating circuit of the soft-start time control circuit shown in FIG. 1.

FIG. 4 shows a circuit diagram of an embodiment of the first gating circuit 70 of the soft-start time control circuit shown 100 in FIG. 1. FIG. 5 shows a circuit diagram of an embodiment of the second gating circuit 80 of the soft-start time control circuit shown 100 in FIG. 1. The first gating circuit 70 is electronically connected to the controller 10, to the DC power supply 200, and to the first drive circuit 20. The second gating circuit 80 is electronically connected to the controller 10, to the DC power supply 200, and to the second drive circuit 60. The input unit 40 is further capable of inputting the output voltage Vout of the DC power supply 200. The controller 10 determines whether output voltage Vout is in a first range (such as 2.5V-17V for example) or in a second range (such as 17V-80V for example), and controls the first and second gating circuits 70 and 80 to connect one of the first and second drive circuits 20 and 60 to the DC power supply 200, according to the determination.

The first gating circuit 70 includes a relay K1. The relay K1 includes a first control terminal 1, a second control terminal 2, an input terminal 3, an output terminal 4, and a coil L electronically connected between the first and second control terminals 1 and 2. The controller 10 includes a first control pin P1 and a second control pin P2. The first control terminal 1 of the relay K1 is electronically connected to the first control pin P1; the second control terminal 2 is grounded; the input terminal 3 is electronically connected to the DC power supply 200, and the output terminal 4 is electronically connected to the first drive circuit 20. The controller 10 switches the relay K1 to make the electric connection between the DC power supply 200 and the first drive circuit 20.

In detail, the first gating circuit 70 further includes a common emitter NPN type bipolar junction transistor (BJT) Q1, a common emitter PNP type BJT Q2, a first biasing circuit (not labeled), a second biasing circuit (not labeled), a discharge diode D1, and a filtering capacitor C7. An input of the common emitter NPN type BJT Q1 is electronically connected to the controller 10, an output of the BJT Q1 is electronically connected to an input of the common emitter PNP type BJT Q2, and an emitter e1 of the BJT Q1 is grounded. An output of the BJT Q2 is electronically connected to the first control terminal 1 of the relay K1 via a resistor R12, and an emitter e2 of the BJT Q2 is electronically connected to a power supply, such as a +5V power supply for example. The first biasing circuit includes two resistors R8 and R9 connected in series between the first control pin P1 of the controller 10 and ground. A base b1 of the BJT Q1 is electronically connected to a node between the two resistors R8 and R9. The second biasing circuit includes two resistors R10 and R11 connected in series between the +5V power supply and a collector cl of the BJT Q1. A base b2 of the BJT Q2 is electronically connected to a node between the two resistors R10 and R11. The filtering capacitor C7 is electronically connected between the +5V power supply and ground. An anode of the discharge diode D1 is electronically connected to the first control terminal 1 of the relay K1, and a cathode of the discharge diode D1 is electronically connected to the second control terminal 2 of the relay K1; the discharge diode D1 discharges the coil L when the relay K1 is opened.

When the controller 10 outputs a high voltage signal (e.g. logic 1) to the base b1 of the BJT Q1, the BJT Q1 is switched on, and the BJT Q2 is also switched on. At this time, a current output from the +5V power supply flows to the coil L via the BJT Q2, to drive the input terminal 3 to connect to the output terminal 4, thereby connecting the DC power supply 200 to the first drive circuit 20. Alternatively, when the controller 10 outputs a low voltage signal (e.g. logic 0) to the base b1 of the BJT Q1, the BJT Q1 is switched off, and the BJT Q2 is also switched off. At this time, the coil L of the relay K1 is disconnected from the +5V power supply, and the input terminal 3 is disconnected from the output terminal 4, thereby disconnecting the DC power supply 200 from the first drive circuit 20.

The second gating circuit 80 has the same components and electronic connections relationship as the components and electronic connections relationship of the first gating circuit 70, and differs from the first gating circuit 70 only in that the output terminal 4 of the relay K1 of the second gating circuit 80 is electronically connected the second drive circuit 60, and the base b1 of the BJT Q3 of the second gating circuit 80 is electronically connected to a second control pin P2 of the controller 10.

In use, the working process of the soft-start time control circuit 10 can be carried out by, but is not limited to the following steps. The input unit 40 inputs the desired soft-start time and the value of the output voltage Vout of the DC power supply 200 to the controller 10. The controller 10 determines whether the output voltage Vout of the DC power supply 200 is in the first range or in the second range. If the output voltage Vout is in the first range, the controller 10 calculates the resistance of the first potentiometer of the digital potentiometer 30 according to the soft-start time and the capacitance of the first charge capacitor C1, and regulates the first potentiometer to the calculated resistance. After that, the controller 10 closes the relay K1 of the first gating circuit 70, and opens the relay K1 of the second gating circuit 80. Such that, when the first capacitor C1 is fully charged, the output voltage Vout of the DC power supply 100 is output to the load via the first gating circuit 70 and the first drive circuit 20. Alternatively, if the output voltage Vout is in the second range, the controller 10 calculates the resistance of the second potentiometer of the digital potentiometer 30 according to the soft-start time and the capacitance of the second charge capacitor C2, and regulates the second potentiometer to the calculated resistance. After that, the controller 10 closes the relay K1 of the second gating circuit 80, and opens the relay K1 of the first gating circuit 70. Such that, when the second charge capacitor C2 is fully charged, the output voltage Vout of the DC power supply 100 is output to the load via the second gating circuit 80 and the second drive circuit 60.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A control circuit for controlling a soft-start time of a direct current (DC) power supply, comprising:
   a digital potentiometer comprising a first potentiometer;
   a first drive circuit comprising a first driver, a first metal-oxide-semiconductor field-effect transistor (MOSFET), and a first charge capacitor; and
   a controller electronically connected to the digital potentiometer;
   wherein the first MOSFET is electronically connected between the output of the DC power supply and a load, and is electronically connected to the driver via the first potentiometer; the first charge capacitor is electronically connected to a node between the first MOSFET and the first potentiometer; the first driver is electronically connected to the DC power supply, the first driver charges the first charge capacitor via the first potentiometer when the DC power supply is first switched on, and the first MOSFET is switched on to connect the DC power supply to the load when the first charge capacitor is fully charged; the controller regulates resistance of the first potentiometer to regulate a charge time constant of the first charge capacitor, enabling a gradual rise in voltage supplied, from approximately zero to full power, within a desired period of time.

2. The control circuit of claim 1, wherein a drain of the first MOSFET is electronically connected to the DC powers supply, a source of the first MOSFET is electronically connected to the load, and a gate of the first MOSFET is electronically connected to the first potentiometer; a node between the first potentiometer and the gate of the first MOSFET is grounded via the first charge capacitor.

3. The control circuit of claim 1, wherein the first driver comprises an enable pin, the first drive circuit further includes a first voltage dividing resistor and a second voltage dividing resistor connected in series between the DC power supply and ground, the enable pin is electronically connected to a node between the first and second voltage dividing resistors.

4. The control circuit of claim 1, further comprising an input unit electronically connected to the controller, wherein the input unit inputs a desired soft-start time of the DC power supply to the controller, the controller regulates the digital potentiometer according to the desired soft-start time, thereby regulating the charge time constant to equal to the desired soft-start time.

5. The control circuit of claim 4, wherein the input unit further inputs a output voltage of the DC power supply to the controller, the control circuit further comprises a second drive circuit, a first gating circuit, and a second gating circuit; the second drive circuit regulate the soft-start time of the DC power supply under the control of the controller; the first gating circuit is electronically connected between the first drive circuit and the DC power supply, the second gating circuit is electronically connected between the second drive circuit and the DC power supply; when the controller determines the output voltage of the DC power supply is within a first range, the controller controls the first gating circuit to connect the DC power supply to the first drive circuit; when the controller determine the output voltage of the DC power supply is within a second range, the controller controls the second gating circuit to connect the DC power supply to the second drive circuit.

6. The control circuit of claim 5, wherein the digital potentiometer further comprises a second potentiometer, the second drive circuit comprises a second driver, a second MOSFET, and a second charge capacitor; a gate of the second MOSFET is electronically connected to the second driver via the second potentiometer, a drain of the second MOSFET is electronically connected to the output of the DC power supply, a node between the gate of the second MOSFET and the second potentiometer is grounded via the second charge capacitor; the second driver is electronically connected to the DC power supply via the second gating circuit, the second driver charges the second charge capacitor via the second potentiometer when the DC power supply starts, and the second MOSFET is switched on to connect the DC power supply to the load when the second charge capacitor is fully charged; the controller regulates the resistance of the second potentiometer to regulate a charge time constant of the second charge capacitor.

7. The control circuit of claim 5, wherein the first gating circuit comprises a relay, the relay comprises an input terminal electronically connected to the DC power supply, and an output terminal electronically connected to the first drive circuit, the controller control the switch of the relay to control the electric connection between the DC power supply and the first drive circuit.

8. The control circuit of claim 7, wherein the relay further comprises a first control terminal, a second control terminal, and a coil electronically connected to the first and second control terminals, the first gating circuit further comprises a power supply, a common emitter NPN type bipolar junction transistor (BJT), and a common emitter PNP type BJT; an input of the common emitter NPN type BJT is electronically connected to the controller, an output of the common emitter NPN type BJT is electronically connected to an input of the common emitter PNP type BJT, and an emitter of the common emitter NPN type BJT is grounded; an output of the common emitter PNP type BJT is electronically connected to the first control terminal of the relay, and an emitter of the common emitter PNP type BJT is electronically connected to the power supply.

9. The control circuit of claim 8, wherein the first gating circuit further comprises a first biasing circuit, the first biasing circuit comprises two resistors connected in series between the controller and ground, a base of the common emitter NPN type BJT is electronically connected to a node between the two resistors.

10. The control circuit of claim 7, wherein the first gating circuit further comprises a discharge diode, an anode of the diode is electronically connected to the second control terminal of the relay, and a cathode of the diode is electronically connected to the first control terminal of the relay.

11. A control circuit for control a soft-start time of a direct current (DC) power supply, comprising:

a digital potentiometer comprising a first potentiometer;

a first drive circuit comprising a first driver, a first charge capacitor, and a first metal-oxide-semiconductor field-effect transistor (MOSFET) electronically connected to the first driver via the first potentiometer, the first driver electronically connected to the DC power supply, the first MOSFET electronically connected between the DC power supply and a load, the first capacitor electronically connected to a node between the first MOSFET and the first potentiometer; and a controller electronically connected to the digital potentiometer;

wherein the first driver charges the first charge capacitor when the DC power supply is first switched on, the first charge capacitor supplies a voltage to the first MOSFET, the voltage supplied to the first MOSFET is increased as the first driver charging the first charge capacitor until the first MOSFET is switched on to connect the DC power supply to the load; the controller regulates the resistance of the first potentiometer to regulate a charge speed of the first charge capacitor, thereby regulating a switch-off duration of the first MOSFET.

12. The control circuit of claim 11, wherein a drain of the first MOSFET is electronically connected to the DC powers supply, a source of the first MOSFET is electronically connected to the load, and a gate of the first MOSFET is electronically connected to the first potentiometer; a node between the first potentiometer and the gate of the first MOSFET is grounded via the first charge capacitor.

13. The control circuit of claim 11, wherein the first driver comprises an enable pin, the first drive circuit further includes a first voltage dividing resistor and a second voltage dividing resistor connected in series between the DC power supply and ground, the enable pin is electronically connected to a node between the first and second voltage dividing resistors.

14. The control circuit of claim 11, further comprising an input unit electronically connected to the controller, wherein the input unit inputs a desired soft-start time of the DC power supply to the controller, the controller regulates the digital potentiometer according to the desired soft-start time, thereby regulating the charge time constant to equal to the desired soft-start time.

15. The control circuit of claim 14, wherein the input unit further inputs a output voltage of the DC power supply to the controller, the control circuit further comprises a second drive circuit, a first gating circuit, and a second gating circuit; the second drive circuit regulate the soft-start time of the DC power supply under the control of the controller; the first gating circuit is electronically connected between the first drive circuit and the DC power supply, the second gating circuit is electronically connected between the second drive circuit and the DC power supply; when the controller determines the output voltage of the DC power supply is within a first range, the controller controls the first gating circuit to connect the DC power supply to the first drive circuit; when the controller determine the output voltage of the DC power supply is within a second range, the controller controls the second gating circuit to connect the DC power supply to the second drive circuit.

16. The control circuit of claim 15, wherein the digital potentiometer further comprises a second potentiometer, the second drive circuit comprises a second driver, a second MOSFET, and a second charge capacitor; a gate of the second MOSFET is electronically connected to the second driver via the second potentiometer, a drain of the second MOSFET is electronically connected to the output of the DC power supply, a node between the gate of the second MOSFET and the second potentiometer is grounded via the second charge capacitor; the second driver is electronically connected to the DC power supply via the second gating circuit, the second driver charges the second charge capacitor via the second potentiometer when the DC power supply starts, and the second MOSFET is switched on to connect the DC power supply to the load when the second charge capacitor is fully charged; the controller regulates the resistance of the second potentiometer to regulate a charge time constant of the second charge capacitor.

17. The control circuit of claim 15, wherein the first gating circuit comprises a relay, the relay comprises an input terminal electronically connected to the DC power supply, and an output terminal electronically connected to the first drive circuit, the controller control the switch of the relay to control the electric connection between the DC power supply and the first drive circuit.

18. The control circuit of claim 17, wherein the relay further comprises a first control terminal, a second control terminal, and a coil electronically connected to the first and second control terminals, the first gating circuit further comprises a power supply, a common emitter NPN type bipolar junction transistor (BJT), and a common emitter PNP type BJT; an input of the common emitter NPN type BJT is electronically connected to the controller, an output of the common emitter NPN type BJT is electronically connected to an input of the common emitter PNP type BJT, and an emitter of the common emitter NPN type BJT is grounded; an output of the common emitter PNP type BJT is electronically connected to the first control terminal of the relay, and an emitter of the common emitter PNP type BJT is electronically connected to the power supply.

19. The control circuit of claim 18, wherein the first gating circuit further comprises a first biasing circuit, the first biasing circuit comprises two resistors connected in series between the controller and ground, a base of the common emitter NPN type BJT is electronically connected to a node between the two resistors.

20. The control circuit of claim 17, wherein the first gating circuit further comprises a discharge diode, an anode of the diode is electronically connected to the second control terminal of the relay, and a cathode of the diode is electronically connected to the first control terminal of the relay.

* * * * *